United States Patent [19]

Mammano et al.

[11] Patent Number: 5,414,342
[45] Date of Patent: May 9, 1995

[54] VOLTAGE MODE PULSE WIDTH MODULATION CONTROLLER

[75] Inventors: Robert A. Mammano, Costa Mesa, Calif.; Larry Wofford, Cary, N.C.

[73] Assignee: Unitrode Corporation, Billerica, Mass.

[21] Appl. No.: 54,843

[22] Filed: Apr. 29, 1993

[51] Int. Cl.⁶ .................................................. G05F 1/44
[52] U.S. Cl. ......................................................... 323/288
[58] Field of Search ............... 323/288, 289, 280, 242, 323/326

[56] References Cited

U.S. PATENT DOCUMENTS

| | | | |
|---|---|---|---|
| 3,863,140 | 1/1975 | Easter et al. | 323/17 |
| 4,458,199 | 7/1984 | Evans et al. | 323/286 |
| 4,502,104 | 2/1985 | Mitchell | 363/26 |
| 4,536,700 | 8/1985 | Bello et al. | 323/285 |
| 4,636,711 | 1/1987 | Freymuth | 323/282 |
| 4,651,266 | 3/1987 | Fujioka et al. | 363/39 |
| 4,734,844 | 3/1988 | Rhoads | 363/72 |
| 4,754,385 | 6/1988 | McDade et al. | 363/16 |
| 4,757,436 | 7/1988 | Ueda et al. | 363/54 |
| 4,803,611 | 2/1989 | Sashida et al. | 363/98 |
| 4,812,669 | 3/1989 | Takeda et al. | 363/98 |
| 4,827,391 | 5/1989 | Sills | 363/41 |
| 4,835,411 | 5/1989 | Takeda | 363/37 |
| 4,835,454 | 5/1989 | White | 323/222 |
| 4,903,187 | 2/1990 | Doi et al. | 363/95 |
| 4,943,902 | 7/1990 | Severinsky | 363/80 |
| 4,958,121 | 9/1990 | Cuomo et al. | 323/224 |
| 4,967,887 | 11/1990 | Annacchino et al. | |
| 4,987,351 | 1/1991 | Disser et al. | |
| 5,006,975 | 4/1991 | Neufeld | 323/222 |
| 5,055,762 | 10/1991 | Disser et al. | |
| 5,068,570 | 11/1991 | Oda et al. | |

Primary Examiner—Steven L. Stephan
Attorney, Agent, or Firm—Weingarten, Schurgin, Gagnebin & Hayes

[57] ABSTRACT

A pulse width modulator voltage feedforward circuit which includes a gating circuit for providing a control signal to a charge circuit which charges an integration circuit with a current proportional to an input voltage. The integration circuit provides an output ramp signal waveform having a slope proportional to the input voltage value. The gating circuit also provide a control signal to a discharge circuit, to thus alternately charge and discharge the integration circuit. The gating circuit insures that a minimum deadtime for a transformer reset will occur regardless of input voltage variations by preventing a fixed frequency signal provided by an oscillator from beginning a new ramp waveform signal period until the integration circuit is discharged to a minimum reference voltage level.

13 Claims, 2 Drawing Sheets

VOLTAGE MODE PULSE WIDTH MODULATION CONTROLLER

FIELD OF THE INVENTION

This invention relates to pulse width modulator circuits and more particularly to voltage feedforward circuits.

BACKGROUND OF THE INVENTION

As is known in the art, a pulse width modulator (PWM) circuit for switching a power switching device on and off may be provided by a comparator which compares an output signal from a control amplifier with a ramp waveform signal. The circuit may be configured such that an output load switch is on when the control amplifier output signal is greater than the ramp voltage and conversely, the output switch is off when the voltage level of the ramp waveform has a value greater than the output voltage of the control amplifier. Thus, the length of time the switch is on may be controlled by the output voltage of the control amplifier.

The ramp waveform typically completes one cycle between a minimum value and a maximum value within each period of the system's switching frequency. With this technique the amount of energy delivered to a load may be controlled by the length of time the switch is on during each period as compared to the total period of each switching cycle.

The ramp waveform may be provided by charging a capacitor with a current derived from the input supply voltage. This may be accomplished by coupling a resistor between the input voltage source and a first terminal of the capacitor. Thus, the resistor is coupled to the same input voltage source which is supplying energy to the load.

With this technique, an increase in the input voltage level provides a concomitant increase in the current charging the capacitor. Thus the rising voltage level of the ramp signal will increase to a relatively steep slope which results in the ramp signal voltage becoming greater than the voltage level of the control amplifier output signal in a relatively short period of time.

Similarly, as the input voltage is lowered, the slope of the ramp signal voltage decreases such that it takes a longer period of time for the voltage level of the ramp signal to increase past the control amplifier output voltage level. This results in a longer output pulse. Thus, when the input voltage is relatively large the output pulse-width is narrow and when the input voltage is relatively small the output pulse is wide with no action necessary from the control amplifier.

Energy is proportional to the product of the voltage amplitude and the time duration that the voltage is applied to the load. Thus, the above arrangement, generally referred to as a voltage feedforward circuit, may ideally deliver constant energy to the output regardless of the input voltage.

Such a circuit may be operated at a constant switching frequency by coupling a switch in parallel with the capacitor terminals and switching the switch via a fixed frequency oscillator. The switch should be switched for a duration of time long enough to discharge the capacitor. In the on state the switch provides a very low impedance and thus the capacitor rapidly discharges in an amount of time which is negligible with respect to the time of a full period.

In such circuits however, it is often desirable to provide a time interval during which the switch is assured to be off. This is generally referred to as a dead-time period. The dead-time is provided to allow time for the reset of magnetic components within the power supply. Thus, the range of the duty cycle modulation is limited to insure that there always exists a dead-time period.

To slow the discharge of the capacitor through the switch, a resistor may be coupled between a first terminal of the switch and a first terminal of the capacitor. The circuit may thus be arranged such that while the capacitor is discharging the output transistor may be turned off. Thus, by selecting resistors having predetermined values, a dead-time may be programmed into the circuit.

It is difficult, however, to provide a circuit which operates at a constant switching frequency and which has both voltage feedforward circuit characteristics and a duty cycle clamp. This is because the variable charging time of the capacitor tends to move the discharge time with respect to the total switching period and either switching frequency may vary, or at low input voltages, the capacitor may not be completely discharged by the end of the period. This results in a reduction in the dead-time period. Thus, it has been relatively difficult to provide a circuit operating at a constant switching frequency having both voltage feedforward characteristics and duty cycle clamp characteristics.

SUMMARY OF THE INVENTION

In accordance with the present invention, a pulse width modulator voltage feedforward circuit includes an oscillator for providing a fixed frequency signal to a first input port of a gating circuit. A first output port of the gating circuit is coupled to a charging circuit which is coupled to an integration circuit at a feedforward node. The charging circuit provides to the integration circuit a charge current proportional to an input supply voltage such that the integration circuit provides a ramp waveform output signal having a slope proportional to the input voltage. A discharge circuit is coupled between a second output port of the gating circuit and the capacitor at the feed forward node. The gating circuit bounds the signal level of the ramp waveform signal between first and second reference potentials by alternately coupling and decoupling, respectively, the charging and discharging circuits from the node to thus charge and discharge the integration circuit. Furthermore, the gating circuit prevents the initiation of a new ramp waveform signal period by decoupling the charging circuit from the feedforward node until the voltage level at the feedforward node corresponds to a first one of said first and second reference potentials. The gating circuit is also coupled to a logic gate which insures that an output circuit may only be active during the rising portion of the ramp waveform.

With this particular arrangement, a fixed frequency feedforward circuit may provide a variable ramp waveform signal while still insuring a programmable minimum deadtime. The charging circuit may be provided as a voltage controlled current source having a first input port coupled to an input voltage source and having a second input port coupled to the gating circuit. The integration may be provided as a capacitor having a first electrode coupled to the feedforward node and a second electrode coupled to ground. The discharge circuit may include a resistively controlled current sink having a first input port coupled to the feedforward node and having a second input port coupled to the gating circuit. The gating circuit includes a logic circuit having a comparator circuit coupled thereto. The comparator circuit includes a pair of comparators, each of the comparators having a first input port coupled to the capacitor and a second input port coupled to a respective one of first and second reference potentials. Each of the comparators have output ports coupled to a corresponding one of a pair of logic circuit input ports. A first logic circuit output port is coupled to the charging circuit and a second logic circuit output port is coupled to the discharge circuit. The comparators compare the voltage level at the capacitor to the value of the first and second reference potentials and provide a first pair of control signals to the logic circuit. At the beginning of a period, the charging circuit is coupled to the capacitor and the discharge circuit is decoupled from the capacitor. Thus, the charging circuit charges the capacitor to provide a ramp voltage signal having a ramp waveform with a slope proportional to the value of the input voltage source. When the voltage level of the ramp signal reaches a value corresponding to the first reference potential, the comparator circuit provides a first control signal to the logic circuit. In response to the control signal, the logic circuit provides logic signals to the charging and discharging circuits to uncouple the charging circuit and to couple the discharge circuit to the capacitor and thus discharge the capacitor. The capacitor discharges at a rate which is proportional to the resistance value of a resistor coupled between the current sink and ground. When the voltage level of the ramp signal equals a value corresponding to the second reference potential, the ramp signal is maintained at that voltage level. The logic circuit is subsequently reset and accepts a signal from the oscillator coupled thereto to thus begin the next period. If the voltage level of the ramp signal has not fully returned to a value equal to the value of the second reference voltage by the end of the period, then the logic circuit fails to accept the clock pulse from the timing oscillator and the entire next period is blanked, essentially skipping a ramp waveform and unconditionally insuring adequate time to reset those circuit components in the power supply which are responsive to magnetic field energy.

Thus, in response to the control signals provided by the gating circuit to the charge and discharge circuits, the charging circuit charges the capacitor with a current proportional to the input voltage to thus provide feedforward. Moreover, the gating circuit prevents the oscillator from beginning a new ramp waveform signal period until the ramp capacitor is discharged to a minimum reference voltage level corresponding to the second reference potential. This insures that the minimum deadtime for a transformer reset will always occur regardless of the input voltage variations.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
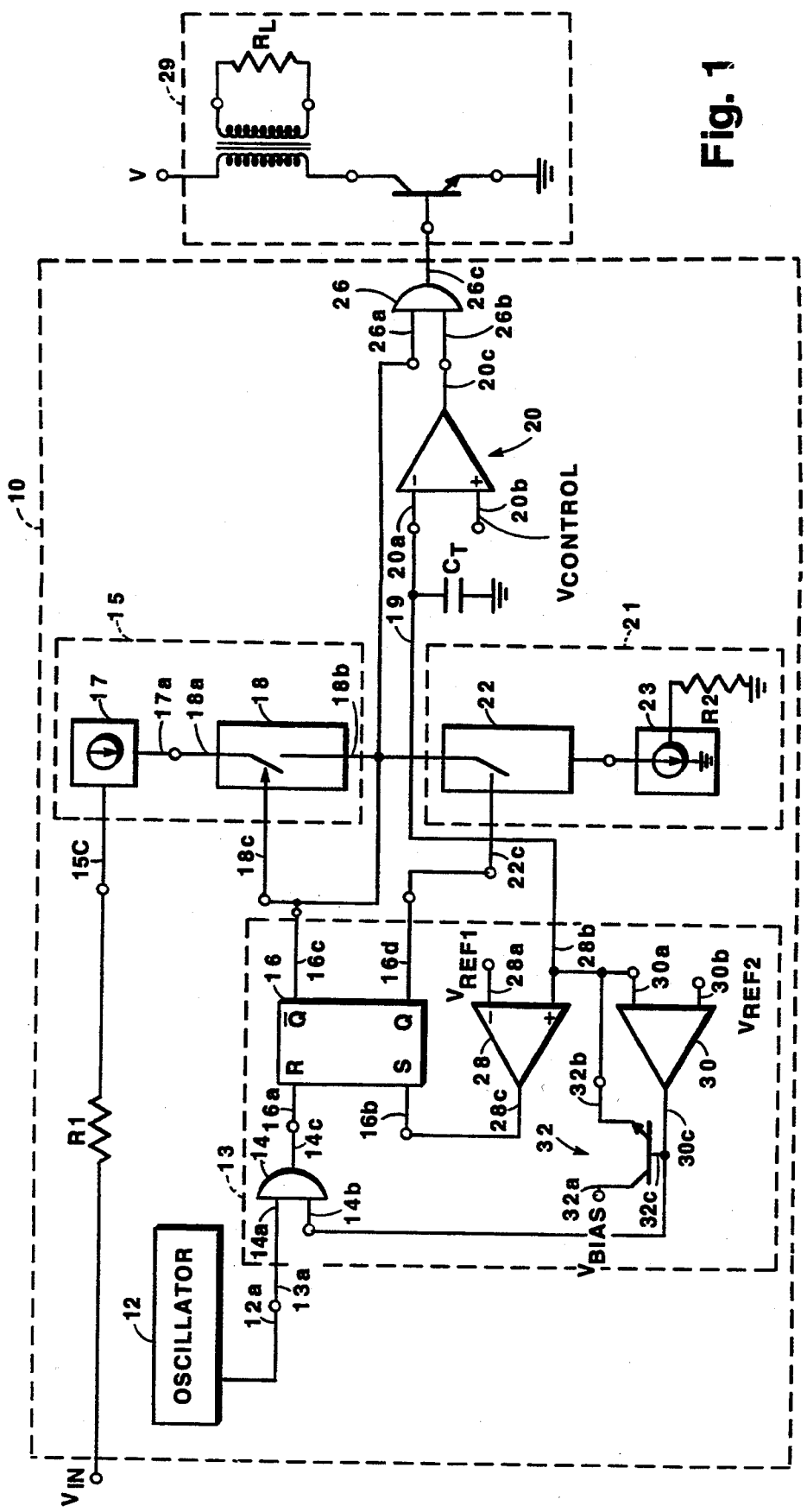
FIG. 1 is a schematic diagram of a voltage feedforward circuit.

Referring now to FIG. 1, a voltage feedforward circuit 10 includes an oscillator 12 having an output port 12a coupled to a first input port 13a of a gating circuit 13. The oscillator 12 provides an oscillation signal having a predetermined fixed frequency and a predetermined signal level. The gating circuit input port 13a is coupled to an input port 14a of a first logic circuit 14. An output port 14c of the first logic circuit 14 is coupled to a first input port 16a of a second logic circuit 16. The logic circuit 16 is here provided as a Reset-Set (RS) flip-flop wherein the input terminal 16a corresponds to the reset port of the logic circuit 16.

An input voltage source $V_{IN}$ is coupled through a resistor R1 to a control port 15c of a charging circuit 15. The charging circuit 15 here includes a current source 17 and a switch 18 coupled as shown with a current source output port 17a coupled to a first port 18a of the switching circuit 18. A second port 18b of the switching circuit 18 is coupled to a feedforward node 19. The current source provides a current proportional to a current through the resistor R1 which is defined by the voltage $V_{IN}$.

An integration circuit, here provided as a capacitor $C_T$, has a first electrode coupled to the feedforward node 19 and a second electrode coupled to a reference potential here the reference potential corresponds to ground. The charging circuit provides a charging current to the capacitor $C_T$ and thus provides, at the feedforward node, a signal having a ramp waveform.

A discharge circuit 21 has a first port coupled to the feedforward node 19 to thus provide a discharge signal path to the capacitor $C_T$. The discharge circuit 21 here includes a second switching circuit 22 which has a first port 22a coupled to the feedforward node 19 and a second port 22b coupled to ground through a current sink 23. The value of the sink current may be programmed by the resistance value of a resistor R2. The switching circuits 18 and 22 each have control ports 18c, 22c coupled to a corresponding one of a pair of output ports 16c, 16d of the second logic circuit 16.

The output terminals logic circuit 16 provide control signals at the output terminals 16c and 16d to the pair of switches 18, 22 to alternately activate the switches 18 and 22 to alternately charge and discharge the capacitor $C_T$. The output terminal 16c is also coupled to output a third logic circuit here provided as an AND gate 26 such that the circuit 10 may only provide an output pulse during the time when the capacitor $C_T$ is charging.

A first input port 20a of a comparator circuit 20 is coupled to the feedforward node and a second input port 20b of the comparator 20 receives a control voltage $V_{CONTROL}$ which may be provided from a control feedback signal from a power supply output (not shown) for example. An output port 20c of the comparator 20 is coupled to an output switching circuit 29 through the third logic circuit 26. The comparator 20 compares the voltage level of $V_{CONTROL}$ to the voltage level of the ramp waveform to activate an output switching circuit 29. Thus, the control voltage may be provided to the comparator 20 to control the duty cycle of the output switching circuit 29.

The gating circuit 13 further includes a comparator 28 having a first input port 28a coupled to a first reference potential $V_{REF1}$ and a second input port 28b coupled to the feedforward node 19. An output port 28c of the comparator 28 is coupled to the set port 16b of the flip-flop 16. A second comparator circuit 30 has a first input port 30a coupled to the feedforward node 19. A second input port 30b of the comparator circuit 30 is coupled to a second reference potential $V_{REF2}$. A transistor 32 having collector, emitter and base electrodes 32a–32c, respectively, here has the base electrode 32c coupled to the output port 30c of the third comparator circuit 30 and a emitter electrode, 32b coupled to the first input port 30a of the third comparator 30. A collector electrode 32a, is coupled to a bias potential $V_{BIAS}$. The output port 30c of the third comparator circuit 30 is coupled to the second input port 14b of the first logic circuit 14. The transistor 32 clamps minimum values of voltage on the capacitor $C_T$ to a value corresponding to $V_{REF2}$.

In operation, when the first switch 18 is closed, a current proportional to the input voltage $V_{IN}$ charges the capacitor $C_T$. While $C_T$ is charging, a signal provided from flip flop output terminal 16c to an the logic gate 26 permits a PWM signal generated by comparator 20 to be coupled to the power output circuit 29. The capacitor $C_T$ may be discharged by opening the first switch 18 and closing the second switch 22. Opening switch 18 prevents any PWM signal from appearing at the output port 26c. By providing the resistor R2 having a predetermined resistance value, the rate at which the capacitor $C_T$ discharges corresponds to the resistance value of the resistor R2. Thus, selection of the resistance value of the resistor R2 the corresponds to a selection of the discharge rate of the capacitor $C_T$. Therefore, a minimum deadtime may be defined by providing the resistor R2 having a predetermined resistance value for a particular value of capacitor $C_T$.

The first and second reference potentials $V_{REF1}$, $V_{REF2}$ coupled, respectively, to the comparator circuits 28, 30 bound the voltage range of the ramp waveform signal between the values $V_{REF1}$ and $V_{REF2}$. Thus, the voltage range of the ramp waveform signals may be selected by selecting the reference voltages $V_{REF1}$, $V_{REF2}$.

The oscillator 12 and the comparator 30 provide signals to the respective input ports 14a, 14b of the first logic circuit 14. In response to the input signals, the logic circuit 14 provides a signal at the output port 14c which is fed to the logic circuit input port 16a. When the logic level of the signal provided to the input port 16a of the logic circuit 16 corresponds to a predetermined voltage level (e.g. a logical high), the logic circuit 16 is reset and a new period is begun. However the first logic circuit 14 provides an output signal having a voltage level corresponding to the first predetermined voltage level only in response to the input signals fed thereto from both the oscillator 12 and the comparator 30 are each provided having predetermined voltage levels.

Thus, for example, the first logic circuit 14 may provide an output signal having a high logic value when the input signals fed thereto from both the oscillator 12 and the comparator 30 are each provided high logic values.

The signal provided from the comparator 30 to the logic circuit 14 will only correspond to a high logic value when the ramp circuit provided by the capacitor $C_T$ and resistor R2 is fully discharged. Thus, the oscillator 12 may not begin a new period until the ramp circuit is fully discharged and the comparator circuit 30 sends a signal having a voltage level corresponding to a high logic value to the logic circuit 14.

Since no output signal may appear at the output port 26c while the ramp circuit is discharging or while it is being held at a voltage level corresponding to $V_{REF2}$, this arrangement insures that the minimum deadtime for a transformer reset will always occur regardless of input voltage variations.

At the start of the period the ramp voltage rises having a slope determined by the value of the input voltage and the value of the resistor $R_1$. That is, when the input voltage level is relatively large, the slope of the ramp signal will be correspondingly large and when the input voltage level is relatively small, the slope of the ramp signal will be correspondingly small. When the voltage value of the ramp signal rises to a value corresponding to the voltage value of the first reference potential $V_{REF1}$, the comparator 28 provides a signal to the input port 16b of the flip-flop 16. In response to such a signal, the logic circuit 16 provides control signals to the switches 18 and 22 to open switch 18 and close switch 22. When this occurs, the capacitor $C_T$ now discharges at a rate determined by selection of the resistor R2. When the voltage level of the ramp circuit equals a level corresponding to the value of the second reference potential $V_{REF2}$, the ramp voltage is clamped at the level corresponding to $V_{REF2}$ and at the same time the AND logic gate 14 for the oscillator clock pulse is set to allow the start the next period with the next clock pulse from oscillator 12.

If the voltage value of the ramp signal has not returned to the level corresponding to $V_{REF2}$ by the end of the period, then the signal provided by the comparator 30 is still in its low state. Thus the logic circuit 14 fails to propagate the clock pulse received from oscillator 12 to the second logic circuit 16 and the entire next period is blanked, essentially skipping an upward pulse and unconditionally assuring adequate time during which those circuit components within the power supply which are responsive to and store magnetic energy may be reset.

It should be noted that although a particular logic scheme has here been shown, those of ordinary skill in the art will recognize that the techniques described herein may be implemented using a variety analog or digital circuits which may use positive or negative digital or analog logic schemes. Such choices may be made to provide a low cost circuit which may be easily and cost effectively manufactured using integrated circuit manufacturing techniques.

Figure 2:
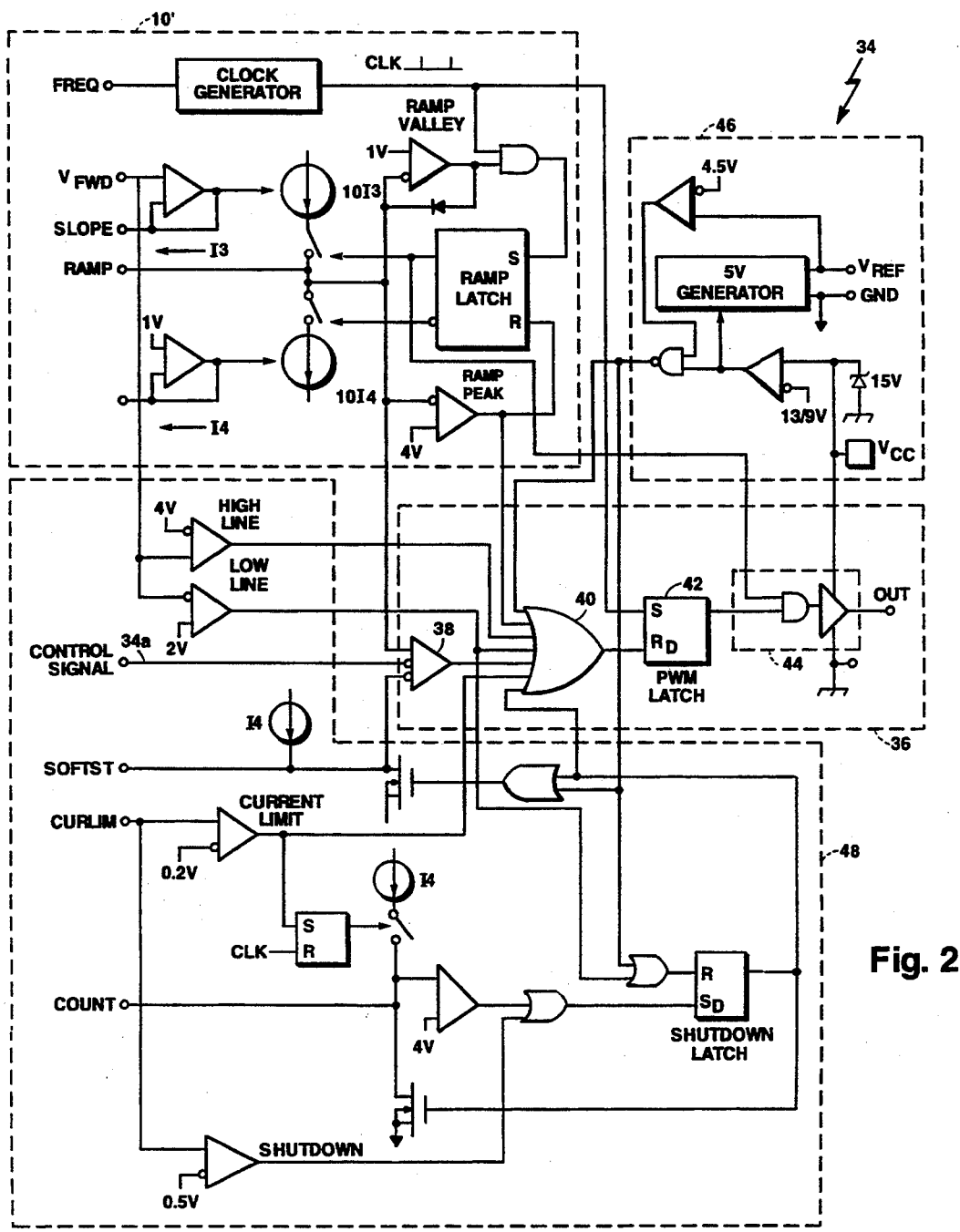
FIG. 2 is a schematic diagram of a pulse-width modulator control circuit including a feedforward circuit of the type described in conjunction with FIG. 1.

Referring now to FIG. 2, a pulse-width modulator (PWM) control circuit 34, which may be provided for example as an integrated circuit, includes a feedforward ramp generator circuit 10' which may be similar to the feedforward circuit 10 described above in conjunction with FIG. 1.

The control circuit 34 further includes a pulse width modulator circuit 36 coupled to the feed forward circuit 10'. The pulse width modulator circuit 36 includes a PWM comparator 38 which compares a variable slope ramp signal fed thereto from the feedforward circuit 10' with an output signal provided from an external control amplifier (not shown) and fed to input terminal 34a. The PWM comparator 38 feeds an output signal to a multiple input OR logic gate 40. An output port of the OR logic gate is coupled to a PWM latch circuit 42. In response to one of the plurality of input signals fed to the OR logic circuit 42 having a high voltage level, the OR logic circuit 42 provides a reset signal to the PWM latch 42 to thus terminate the PWM signal. Thus, the PWM latch circuit 42 insures that the PWM circuit 36 provides only a single pulse per switching period. An output port of the latch circuit 42 is coupled to an output circuit 44 which couples the PWM signal to an external power driver (not shown).

The control circuit 34 further includes a power sequencing and reference circuit 46 coupled to the ramp generator circuit 10′, the pulse width modulator 36, and a fault protection circuit 48. The power sequencing and reference circuit 46 insures orderly turn-on and turn-off sequences of the control circuit 34 and provides a stable reference voltage from which each of the internal reference potentials within the control circuit 34 may be provided.

The fault protection circuit 48 is coupled to the feedforward circuit 10′ and the PWM circuit 36. The fault protection circuit 48 may terminate the PWM process in response to conditions including but not limited to a voltage level on the input voltage line exceeding a predetermined voltage threshold value, a voltage level on the input voltage line falling below a predetermined voltage threshold value, a load or switch current exceeding a predetermined current threshold value, an excessive number of overcurrent transients, or a shutdown signal provided from an external source.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A feedforward circuit having an input port and an output port comprising:
   a gating circuit having a first input port;
   a charging circuit having a first input port coupled to a first output port of said gating circuit, a second input port coupled to an input voltage terminal and an output port coupled to a feedforward node;
   an integration circuit having a first terminal coupled to the output port of said charging circuit at the feedforward node and wherein said charging circuit provides a charging signal to said integration circuit to provide an output signal having a ramp waveform at the feedforward node;
   a discharging circuit having a first input port coupled to a second output port of said gating circuit and having a second input port coupled to said integration circuit at the feedforward node wherein said discharge circuit provides a discharge signal path to said integration circuit; and
   wherein said gating circuit bounds the output signal level between first and second reference potentials and provides control signals to said charging and discharging circuits to alternately couple and decouple said charging and discharging circuits from said integration circuit in response to the signal level of said output signal.

2. The feedforward circuit of claim 1 wherein:
   said integration circuit is provided as a capacitor having a first electrode coupled to the feedforward node and a second electrode coupled to a first reference potential; and
   said gating circuit comprises:
   a first logic circuit having a pair of input ports and an output port wherein a first input port is coupled to the input port of said gating circuit;
   a second logic circuit having an input port coupled to the output port of said first logic circuit and having a pair of output ports, each of said output ports coupled to first and second output ports of said gating circuit;
   a first comparator having a first input port coupled to a first reference potential, a second input port coupled to the feedforward node and having an output port coupled to a second input port of said second logic circuit; and
   a second comparator having a first input port coupled to a second reference potential, a second input port coupled to the feedforward node and an output port coupled to a second input port of said first logic circuit.

3. The feedforward circuit of claim 2 further comprising:
   a third comparator having a first input port coupled to the feedforward node, a second input port coupled to a third reference potential, and an output port coupled to the output port of said feedforward circuit.

4. The feedforward circuit of claim 3 further comprising a fixed frequency oscillator for providing a fixed frequency signal to the first input port of said gating circuit.

5. The feedforward circuit of claim 3 further comprising a third logic circuit having a first input port coupled to the first output port of said gating circuit, a second input port coupled to the output port of said third comparator and having an output port coupled to the output port of said feedforward circuit wherein said third logic circuit prevents an output signal from propagating to the feedforward output port until said capacitor is discharged to the second reference potential.

6. The feedforward circuit of claim 5 wherein said charging circuit comprises:
   a voltage controlled current source for providing a charging current; and
   a charge switch having an input port, an output port and a control port, wherein the charge switch input port is coupled to an output port of said current source, the charge switch control port is coupled to the first output port of said gating circuit and the charge switch output port is coupled to the first electrode of said capacitor, wherein in response to a first signal from said gating circuit, said charge switch provides a low impedance signal path between said current source and the first electrode of said capacitor and in response to a second signal from said gating circuit, said first switch provides a high impedance signal path between said current source and the first electrode of said capacitor and wherein said current source provides a charge current to said capacitor when said charge switch provides a low impedance signal path between said current source and the first electrode of said capacitor.

7. The feedforward circuit of claim 6 wherein said discharging circuit comprises:
   a discharge switch having an input port, an output port and a control port, wherein the discharge switch input port is coupled to the first electrode of said capacitor and the discharge switch control port is coupled to an output port of said gating circuit and wherein said gating circuit provides first and second control signals to the discharge switch control port; and a current sink having a first port coupled to the output port of said discharge switch, wherein in response to the second signal from said gating circuit, said discharge switch provides a low impedance signal path between the current sink and the first electrode of said capacitor and in response to the first signal from said gate circuit, said discharge switch provides a high impedance signal path between the current sink and the first electrode of said capacitor and wherein said current sink provides a discharge current path to charge stored in said capacitor when said discharge switch provides a low impedance signal path between the first electrode of said capacitor and the first port of said current sink.

8. A feedforward circuit comprising:

a current source having an input terminal and an output terminal, said current source for providing a predetermined amount of current in response to a predetermined input voltage level provided to the input terminal;

a first switching device having an input terminal, an output terminal and a control terminal wherein the input terminal of said switching device is coupled to the output terminal of said current source;

an integration circuit having a first terminal coupled to the output terminal of said first switching device at a feedforward node;

a second switching device having an input terminal, an output terminal and a control terminal wherein the input terminal of said second switching device is coupled to the first terminal of said integration circuit for providing a discharge signal path to said integration circuit;

a current sink coupled to the output terminal of said second switching device;

a gating circuit having an input port coupled to the feedforward node and having a pair of output ports, each of said gating circuit output ports coupled to a corresponding one of the control terminals of said first and second switching devices, said gating circuit for providing control signals to each of said first and second switching devices to alternately charge and discharge said integration circuit in response to a voltage level at the feedforward node.

9. The feedforward circuit of claim 8 further comprising:

a comparator circuit having a first input port coupled to the first terminal of said integration circuit at the feedforward node and having a second input port coupled to a first reference potential and having an output port coupled to an output port of said feedforward circuit.

10. The feedforward circuit of claim 9 further comprising a logic circuit having a first input port coupled to a first one of the pair of output ports of said gating circuit and having a second input port coupled to the output port of said comparator circuit and having an output port coupled to the output port of said feedforward circuit wherein said logic circuit prevents an output signal from propagating to the feedforward circuit output port until the voltage level at the feedforward node corresponds to a second reference potential.

11. The feedforward circuit of claim 10 further comprising an oscillator coupled to said first logic circuit for providing a fixed frequency signal to said first logic circuit.

12. A feedforward circuit comprising:

a current source;

a first switch having a first port and a second port with the first switch port coupled to said current source;

a capacitor having a first electrode coupled to the second port of said first switch and a second electrode coupled to a first reference potential wherein said capacitor is charged to provide a ramp waveform signal;

a second switch having a first port and a second port with the first switch port coupled to the first electrode of said capacitor;

a current sink having a first port coupled to the second port of said second switch; and a gating circuit having a first input port adapted to receive an input signal, having a second input port coupled to the second electrode of said capacitor, having a first output port coupled to a control port of said first switch and having a second output port coupled to a control port of said second switch, wherein said gating circuit bounds the voltage level of a ramp waveform between first and second reference potentials and prevents an input signal fed to the first input port of said gating circuit from beginning a new ramp waveform signal period until the voltage level of the ramp waveform corresponds to the first reference potential.

13. The feedforward circuit of claim 12 wherein said gating circuit comprises:

a first logic circuit having a pair of input ports and an output port wherein a first input port is coupled to the first input port of said gating circuit;

a second logic circuit having an input port coupled to the output port of said first logic circuit and having a pair of output ports, each of said output ports coupled to first and second output ports of said gating circuit;

a first comparator circuit having a first input port coupled to a first reference potential, a second input port coupled to the second input port of said gating circuit and having an output port coupled to a second input port of said second logic circuit;

a second comparator circuit having a first input port coupled to a second reference potential, a second input port coupled to the second input port of said gating circuit and an output port coupled to a second input port of said first logic circuit.

* * * * *